UNITED STATES PATENT OFFICE 2,218,179

SHIM FOR MILLING MACHINERY

Arthur Schoenwerk, Berlin, Germany

No Drawing. Application January 14, 1938, Serial No. 185,068. In Germany January 15, 1937

3 Claims. (Cl. 308—244)

The present invention relates to shims or spacers as used in milling operations when mounted on milling arbors.

It is known to use such shims or spacers from 0.001 inch thick up in order of accurately locating a milling cutter on the arbor in any desired position or in view to control the width of slots between two cutters of a set of cutters mounted on an arbor and also of grouped cutters. The shims are particularly requested when cutters have been resharpened for further use and it is primordial importance for the success of the milling operation to locate two of a set of cutters as parallel as possible each to another by the means of shims or spacers, which have to be of an even uniform surface and thickness.

Shims or spacers hitherto used have been manufactured by punching steel sheet or spring steel. According to the thickness of milling arbors in use of up to an outer diameter of 3.5 inches the shims or spacers must have a corresponding size. It is hardly possible to manufacture a steel sheet ribbon or plate 3.5 to 4.0 inches wide on a commercial scale of equal, uniform thickness down to 0.001 of an inch and the thinner the ribbon the less wide it is obtained. Thus it has hitherto not been possible to manufacture very thin shims of a comparatively large outer diameter out of such steel sheets.

It is also desirable to facilitate to the milling operator the choice and the handling of such shims as may be appropriate for the milling operation in instance. Hitherto an onerous measure operation is required to ascertain the exact thickness of each piece before fixing it on the arbor.

The aforesaid disadvantages have been overcome by the present invention in that instead out of steel sheets the shims or spacers are punched out of such an evenly uniform material of different standard of thickness down to 0.00075 inch as can be obtained in the shape of ribbons, films, foils, plates or the like many times larger or wider than steel sheets, and which can be coloured in different contrasting colours and pigments. Thus if one particular colour or pigment is applied to distinguish a certain standard or size of thickness of the shim or spacer considerable time is saved to the milling operator in choosing the appropriate shim and work rendered more efficient. Other advantages achieved in addition consist in the manufacture of shims of a diameter and of a thickness hitherto not known and at such costs as could not be attained if steel sheets had been used.

It has been found that ribbons, foils, films or plates manufactured of cellulose containing solutions such as regenerated cellulose, cellulose esters or cellulose ethers, known in the trade as xylonite, Celluloid, viscose, acetate and the like, are adapted to be used as material for shims or spacers for the purpose of the invention whereby coloured solutions may be used. Particularly satisfying results have been obtained if the material is not attacked by moisture, heat or oil as may occur in the proximity of and in connection with the milling device. Such shims as manufactured in the ordinary punching way out of cellulose acetate foils resist wear, humidity and oil and are of considerable durability.

I claim:

1. A shim for accurately spacing milling machinery parts consisting of exfoliated nonfibrous cellulosic base material, said shim having substantially plane parallel surfaces.

2. A shim for accurately spacing milling machinery parts consisting of exfoliated nonfibrous cellulose derivatives base material and having substantially plane parallel surfaces.

3. A shim for accurately spacing milling machinery parts consisting of colored exfoliated acetylcellulose, said shim having substantially plane parallel surfaces.

ARTHUR SCHOENWERK.